United States Patent [19]
Cherry et al.

[11] 3,795,106
[45] Mar. 5, 1974

[54] BAFFLED SOLID PROPELLANT MOTOR

[75] Inventors: Charles C. Cherry, McGregor; William G. Haymes, Waco, both of Tex.

[73] Assignee: Rockwell International Corporation, El Segundo, Calif.

[22] Filed: July 7, 1972

[21] Appl. No.: 269,905

[52] U.S. Cl. .................. 60/255, 60/200 A, 102/101
[51] Int. Cl. ............................................. F02k 9/04
[58] Field of Search ......... 60/253, 254, 255, 200 A; 102/99–102; 181/69

[56] References Cited
UNITED STATES PATENTS

| | | | |
|---|---|---|---|
| 3,327,481 | 6/1967 | Horvath | 60/255 |
| 3,274,775 | 9/1966 | Berton | 60/253 X |
| 3,555,816 | 1/1971 | Leasure et al. | 60/255 X |
| 2,992,960 | 7/1961 | Leeg et al. | 60/200 A UX |
| 3,124,542 | 3/1964 | Kohn | 60/200 A UX |

*Primary Examiner*—Carlton R. Croyle
*Assistant Examiner*—Robert E. Garrett

[57] ABSTRACT

One or more baffle plates are positioned along the axial length of a solid propellant motor, positioned in a direction transverse to the axis of the motor. Each disc has an aperture therein so that combustion products can pass therethrough; the primary function of the baffle is to alter the destructive characteristics of the pressure waves resultant from the combustion process to break up any axial modes of oscillation.

1 Claim, 5 Drawing Figures

BAFFLED SOLID PROPELLANT MOTOR

BACKGROUND OF THE INVENTION

1. Field of the Invention

Combustion instabilities in solid propellant rocket motors is a problem both in the transverse modes, i.e., radial and circumferential, and in the axial mode, i.e., fore and aft, during the combustion process.

2. Description of the Prior Art

The prior art discloses various configurations of solid propellant grains positioned within a propellant case that makes up a solid rocket motor. For example, U.S. Pat. No. 3,429,265 discloses a solid propellant system for rockets which includes circumferential layers of fuel-rich solid propellant with an inner layer of oxidizer material having two axially extending fuel-rich rods interspersed with the oxidizer core of the solid propellant motor. The object is to have a solid rocket system having oxidizer-rich masses and adjacent solid fuel-rich masses in a grain without contact between these different kinds of masses. The different masses are separated by a thin plastic material that makes up a lining. The aforementioned embodiment has the propellant masses aligned axially in circumferential layers, while another embodiment discloses stacked solid propellant plugs being separated by radial sheets of plastic between the different masses. The plastic separator layers, whether they are longitudinal liners between masses or radially disposed discs between the masses, do not serve as combustion oscillation inhibitors, but rather they serve as separators between different solid propellant masses.

U.S. Pat. No. 3,088,273 discloses stacked cylindrically shaped solid propellant segments which may or may not be separated by a pad of resilient material such as sponge rubber 118 between the segments. The material is radially disposed between the segments of solid propellant material primarily to keep excess heat from the joints of the outside solid propellant case. The rubber pads do not serve to suppress pressure waves of the burning solid propellant mass which may cause oscillations in the longitudinal mode.

U.S. Pat. No. 3,022,735 basically discloses a means to package a very large solid propellant motor. Solid propellant grain segments are axially connected between radially disposed grid plates at either ends of the solid propellant grain segments. The radially disposed grid plates serve to support the solid propellant grain segments during the combustion process. The grids, in no way, serve to provide a baffle to suppress longitudinal modes of oscillation during the combustion process.

A well known method to suppress irregular burning which produces acoustical wave motions within a chamber is the use of an axial rod inserted within the combustion chamber of the solid propellant motor. The rod serves to break up the pressure wave oscillations primarily in the transverse mode, thus damping out the radial or circumferential oscillations within the chamber. However, the rod is ineffective in controlling or suppressing the oscillations that occur in the longitudinal mode.

Another well known method to eliminate the combustion instabilities which occur in the transverse modes, is the addition of a quantity of aluminum particles to the solid propellant grain formulation. While the aluminized propellant effectively eliminates transverse modes of oscillation, they unfortunately do not always affect the axial modes of oscillation.

SUMMARY OF THE INVENTION

It is therefore an object of this invention to provide a method and apparatus to suppress the axial modes of combustion instability oscillations that occur during the combustion process of a solid propellant rocket motor.

More specifically, it is an object of this invention to provide radially disposed baffles or discs transverse to the axis of the solid propellant grain which may be incorporated in a "conventional" case bonded motor design, to suppress the combustion instabilities or oscillations that occur in the longitudinal mode during the combustion process of a solid propellant rocket engine.

Through the use of baffles in combination with a segmented cartridge-loaded grain design, barriers between the segmented grains are provided, thus the baffles serve to basically provide a physical flow obstruction which is oriented perpendicular to the longitudinal axis of the motor, with provision for throughflow of combustion products. The through-flow provision is an aperture in the baffle to allow the gases to pass therethrough. The baffles accomplish their function by altering the fundamental acoustic characteristics of the motor chamber, encompassing, in effect, the acoustic and combustion fields. The baffle may be of a disc configuration with simply a hole in the center, or of such other design as necessary to adapt to a given grain perforation shape. For example, the grain may be star-shaped in the center, thus, the aperture in the center of the baffle could be star-shaped to suit the star-grain of the segmented cartridge-loaded grain design. The baffles may be fabricated from many heat resisting materials, for example, various phenolic composites could be used including asbestos, silica, carbon, and graphite (not usually used with phenolic) and could be of composite construction ,i.e., metal reinforced phenolic composites, etc. The selection of the material for the baffles would depend on the flow conditions (pressure, temperature, and duration) of a particular application.

The cartridge-loaded segmented grain design offers distinct advantages in application of the baffles. The number and location of the baffles may be accommodated easily through arrangement of the grain segments. Further, this design facilitates the use of two or more propellants in required configurations to achieve the desired performance.

Accordingly, an advantage over the prior art is the addition of one or more radially disposed baffle plates along the longitudinal axis of a solid propellant motor to suppress the axial modes of combustion oscillations that may occur during the combustion process.

Still another advantage over the prior art is the ability to utilize segmented cartridge grain designs between the radially disposed baffles. An advantage is gained in that different cartridge-loaded grains may be utilized having different burning characteristics, the different grains having a natural barrier between grains, namely, the radially disposed baffles.

The above noted objects and advantages of the present invention will be more fully understood upon a study of the following description in conjunction with the detailed drawings.

DESCRIPTION OF THE PREFERRED EMBODIMENTS

Figure 1:
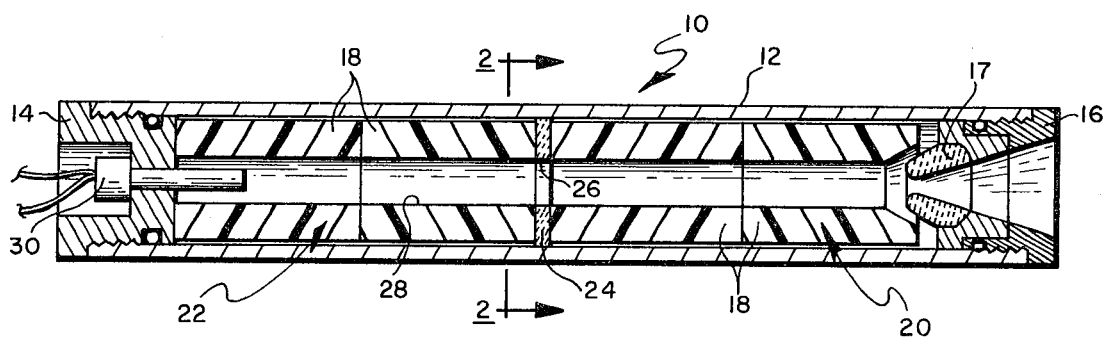
FIG. 1 is a cross-sectional view of a segmented solid propellant rocket motor with a radially extending baffle positioned within the solid propellant case.

Turning now to FIG. 1, the baffled solid rocket motor generally designated as 10 is comprised of a solid rocket motor case 12, having an enclosure 14 at one end and a nozzle portion 16 at the other end, thus making up the basic components of the solid rocket motor. Positioned within case 12 is a series of stacked segmented solid propellant grains 18. The grains, adjacent the nozzle portion 16, in this embodiment are the boost grains 20. The boost grains are separated from a series of sustain grains 22 by baffle plate 24. The baffle plate 24 has an aperture 26, the aperture of which generally is sized in relation to the diameter of the aperture 28 in grains 18 and the nozzle throat diameter.

When an igniter 30 positioned within enclosure 14 is initiated, the segmented grains 18 are ignited which, of course, directs the burned combustion products out through throat 17 of nozzle 16. In an unstable design the burning propellants will invariably initiate an oscillation mode in the axial direction which can, as previously described, introduce catastrophic acoustic characteristics which reverberate in the axial mode of direction. The baffle 24 effectively changes the natural oscillatory mode structure and creates a small loss of pressure across the baffle and this change of natural structure and loss of pressure, or damping effect, prevent build-up of the oscillations in the longitudinal mode, thus preventing damage to the motor.

The use of aluminum particles in the solid propellant grains runs from a few tenths to twenty percent of the grain weight. (It is generally recognized as preventing the occurrence of combustion instability in the transverse modes or modes characterized by high oscillation frequency as heretofore described). The particles, however, frequently do not prevent the build up of oscillations in the longitudinal mode in a solid propellant motor case. The use of the baffle 24 does however damp out the longitudinal modes of oscillations. There is a great deal of interest in producing solid propellant grains that are low-smoke-producing propellants. However, in order to produce the low-smoke propellants, one must remove the smoke-producing particles which provide a damping influence from the propellant grains. Combustion products of these smoke producing particles consist primarily of molten aluminum, aluminum oxide, and iron oxide ingredients. Of course, by reducing the aluminum content in the solid propellant grains, one removes the oscillation suppressing effect of the molten aluminum and aluminum oxide in the combustion gas. The baffle plate 24 dampens these oscillations and furthermore the materials making up the baffle plate, namely reinforced phenolic, etc., as previously described, will not contribute smoke-producing side effects.

Figure 2:
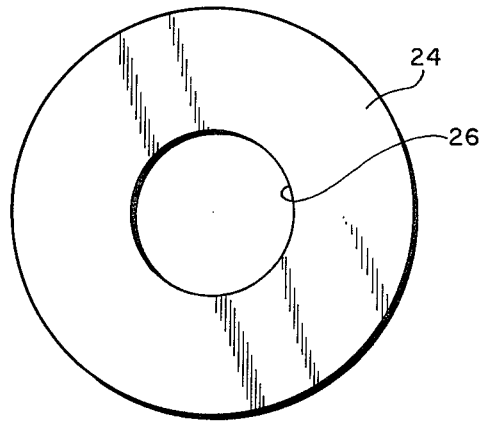
FIG. 2 is a view taken along lines 2—2 of FIG. 1, illustrating the baffle.

Turning now to FIG. 2, the baffle 24 may be fabricated from many different materials. For example, various phenolic composites such as asbestos, silica, carbon, and graphite or tungsten, may be selected for the baffle. The material selections depend primarily on the flow conditions (pressure, temperature, and duration) in a particular application. Also various means may be utilized to bond the baffle within the motor case 12 during the assembly process. For example, the baffle 24 may be bonded into place within the casing 12 prior to insertion of the sustain grains 22 on one side of the baffle and the boost grains 20 inserted from the opposite side of the baffle. To complete the assembly, end closure cap 14 and nozzle assembly 16 are subsequently attached to the case 12. The aperture 26 in baffle 24 is generally of the diameter of the hole 28 within grains 18. Of course, the size of the aperture in the baffle dictates the amount of pressure loss across the baffle which provides the damping effect on the oscillatory motion.

Figure 3:
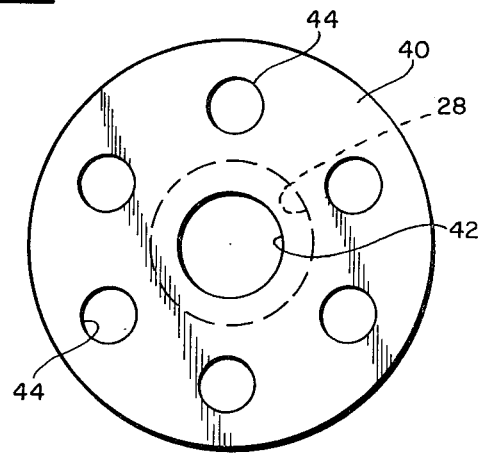
FIG. 3 is an alternative embodiment illustrating a baffle having a different hole pattern therein.

FIG. 3 is illustrative of another embodiment of the invention. Baffle 40 is comprised of a central aperture 42, the aperture in this example is of slightly smaller diameter than aperture 28 in grains 18. A plurality of openings 44 are positioned halfway between the inside diameter of aperture 42 and the outside diameter of baffle 40 and the openings are spaced equidistantly one from the other in a circular pattern. It has been found through experimentation that the pressure drop across the baffle 40 is slightly less than the pressure drop across baffle 24. Baffle 40 additionally exhibits the same oscillation suppressing effects as baffle 24.

Longitudinal modes of oscillation have been found to be especially critical in solid propellant motors when the length versus diameter (L/D) is in the range of 12 to 1.

Figure 4:
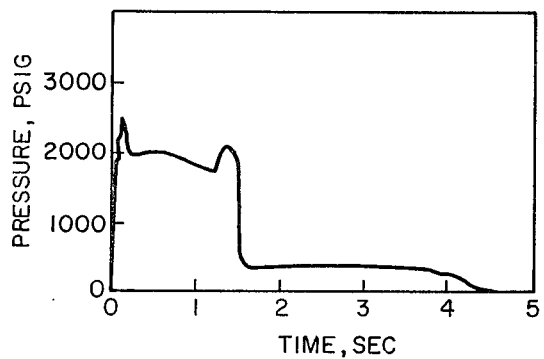
FIG. 4 is a graph illustrating the effect of longitudinal modes of oscillations on the pressure-time curve as they occur in a non-baffled rocket motor.

The graph illustrated in FIG. 4 depicts a pressure versus time plot of the combustion process of a solid propellant motor without a baffle. The first second and one-half is the boost phase (combustion of boost grains 20) and the spike in the transition region between the boost phase and the sustain phase (combustion of grains 22) is an instability spike caused by oscillating waves traversing the longitudinal length of the solid propellant motor and causing the mean propellant burning rate to increase.

Figure 5:
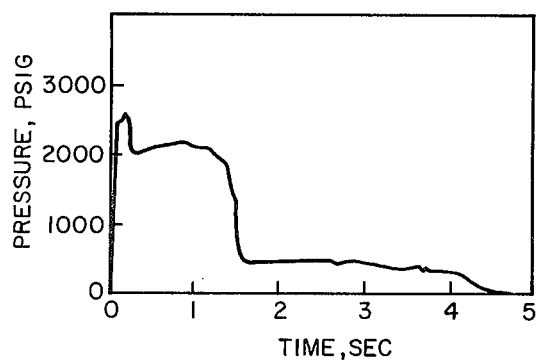
FIG. 5 is a graph illustrating the effect of damping the oscillations after one or more baffles are installed in the rocket motor case.

FIG. 5 is a graph of another solid propellant motor of the same physical characteristics as was utilized in obtaining the data shown in FIG. 4 except that a baffle is employed between the boost and sustain grains. It can readily be seen that no pressure peak occurs in the transition region between the boost and sustain phase of combustion. Oscillatory characteristics of the pressure time performance of the baffled motor were essentially nonexistent.

We claim:

1. A suppression device to prevent instability induced pressure wave oscillations in the longitudinal mode for solid propellant rocket motors comprising:

an elongated solid propellant motor case having a first end containing a source of ignition and a second end containing a nozzle portion, at least two spaced solid propellant grains, said grain having means forming a longitudinally extending aperture therethrough, and at least one baffle plate fabricated from heat resisting material connected within said elongated solid propellant motor case, said baffle plate being oriented transverse to the axis of said motor case, said baffle plate further being positioned within said motor case spaced from said first and second ends of said motor case, said solid propellant grains being placed on either side of said baffle plate, said baffle plate having a central aperture therein that conforms generally to the shape of the longitudinally extending aperture formed by said solid propellant grains, an outside peripheral edge of the baffle plate conforming to the inside shape of said motor case, said baffle plate further including means forming a plurality of openings smaller than said central aperture and radially positioned between said central aperture and the outside peripheral edge of said baffle plate, said baffle plate serving as a physical barrier to pressure wave oscillations in the longitudinal mode that occur during combustion of said grains.

* * * * *